United States Patent [19]
Flueckiger

[11] 3,828,901
[45] Aug. 13, 1974

[54] ELECTRIC COUPLING CONTROL MEANS

[75] Inventor: Noah Flueckiger, Solon, Ohio

[73] Assignee: Acme-Cleveland Corporation, Cleveland, Ohio

[22] Filed: Aug. 1, 1973

[21] Appl. No.: 384,475

[52] U.S. Cl. ............................. 192/12 D, 82/3
[51] Int. Cl. ............................. F16d 67/02
[58] Field of Search .......... 74/813 L, 813 C, 813 R, 74/820; 192/12 D, 84 AA, 84 AB, 18 B; 82/3

[56] References Cited
UNITED STATES PATENTS

| | | | |
|---|---|---|---|
| 3,365,990 | 1/1968 | Jacoby | 82/3 X |
| 3,718,211 | 2/1973 | Schubert et al | 192/12 D |
| 3,744,354 | 7/1973 | Gilbert | 82/3 |

Primary Examiner—Samuel Scott
Assistant Examiner—F. D. Shoemaker
Attorney, Agent, or Firm—Woodling, Krost, Granger & Rust

[57] ABSTRACT

An electrical coupling control system is disclosed for a multiple spindle automatic machine tool which has an indexable spindle carrier with a plurality of rotatable spindles. An electrical clutch and brake unit with a neutral condition is provided for each spindle and the clutch, brake, or neutral condition is selectively established by different values of a single polarity control DC voltage. This selector means controls each particular spindle for each spindle position of the spindle carrier. The foregoing abstract is merely a resume of one general application, is not a complete discussion of all principles of operation or applications, and is not to be construed as a limitation on the scope of the claimed subject matter.

18 Claims, 4 Drawing Figures

ELECTRIC COUPLING CONTROL MEANS

BACKGROUND OF THE INVENTION

Multiple spindle automatic machine tools have a plurality such as four, six, or eight spindles rotatable within an indexable spindle carrier. In general, these spindles are constantly rotating both during indexing and during dwell so that the workpieces in the spindles may be machined by movable tools. In many cases, there is a need to stop one of the multiple spindles in one or more indexed positions of the spindle carrier. This may be for the purpose of working on the workpiece while stationary, for example a cross drilling or cross milling function on the workpiece. Accordingly, in many multiple spindle machine tools, the spindles are not driven directly by gearing but instead are driven through a clutch. In order to obtain faster production of workpieces, the spindle usually also has a brake so that the spindle need not coast to a stop and take too much time. In the past it has been customary to actuate this clutch and brake unit for each spindle by a mechanical lever operated from the main cam system of the machine tool. Mechanical arrangements are subject to considerable wear, especially in high production machines. Also this usually meant that the clutch and brake unit was hung outboard beyond the end ot the spindle carrier adding materially to the length of the entire head stock of the machine tool. Electric clutches have been attempted on machine tools, but in the complexity of a multiple spindle machine tool, one must contend not only with the rotation of the spindles but also the rotation or indexing movement of the spindle carrier itself. Also the lubricating oil and cutting oil environment is hostile to the proper operation of electrical equipment. Attempts have been made at using some form of commutation and brush assembly to control energization to a clutch on a machine tool, and also commutator and brush assemblies have been attempted on machine tools for low current purposes of supplying control signals to or from a rotating part. The deficiencies in the prior art are that *large* current values being applied to an electric clutch and brake for rapid energization thereof has not been satisfactorily solved for spindles in an indexable spindle carrier in the environment of a multiple spindle automatic machine tool which requires fast cycle times in order to be productively competitive. The segmented commutator with one segment for each spindle has meant that the clutch was energized and deenergized each time the spindle carrier was indexed, and this caused burning and pitting of the commutator segments.

Accordingly, an object of the invention is to provide an electrical coupling control which obviates the above mentioned drives.

Another object of the invention is to provide a coupling control for a multiple spindle automatic machine which controls a clutch and brake unit also having a neutral condition.

Another object of the invention is to provide an electric coupling control for a machine tool with DC control voltage and DC power supply all of a single polarity.

Another object of the invention is to provide an electric coupling control for a machine tool wherein the clutches for the various spindles are continuously energized for all indexed positions except where the brake condition is required.

SUMMARY OF THE INVENTION

The invention may be incorporated in an electric coupling control for a multiple spindle automatic machine having means to index a spindle carrier with a plurality of $n$ rotatable spindles therein and having drive means to rotate the spindles, said electric coupling control comprising in combination, a clutch and brake unit including coil means for each of said spindles, each spindle in the spindle carrier having a first coupling through the associated clutch to the drive means and having a second coupling through the associated brake to the spindle carrier to brake the spindle relative to the spindle carrier, clutch and brake actuation means for at least one of said units including, power source means, relatively rotatable bruch and conductor assemblies, means to establish relative rotation between said assemblies in accordance with indexing movements of the spindle carrier, said actuation means including means connecting said power source means through said brush and conductor assemblies to establish energization of said coil means in first and second electrical conditions to actuate said one clutch and said one brake, respectively, selector means including said conductor assembly to provide electrical energization to said coil means in each of said spindles for selective clutch or brake actuation, and control means for each clutch and brake unit operable from a single polarity voltage from said power source means to establish said first and second electrical conditions of said actuation means.

Other objects and a fuller understanding of the invention may be had by referring to the following description and claims, taken in conjunction with the accompanying drawing.

DESCRIPTION OF THE PREFERRED EMBODIMENT

Figure 1:
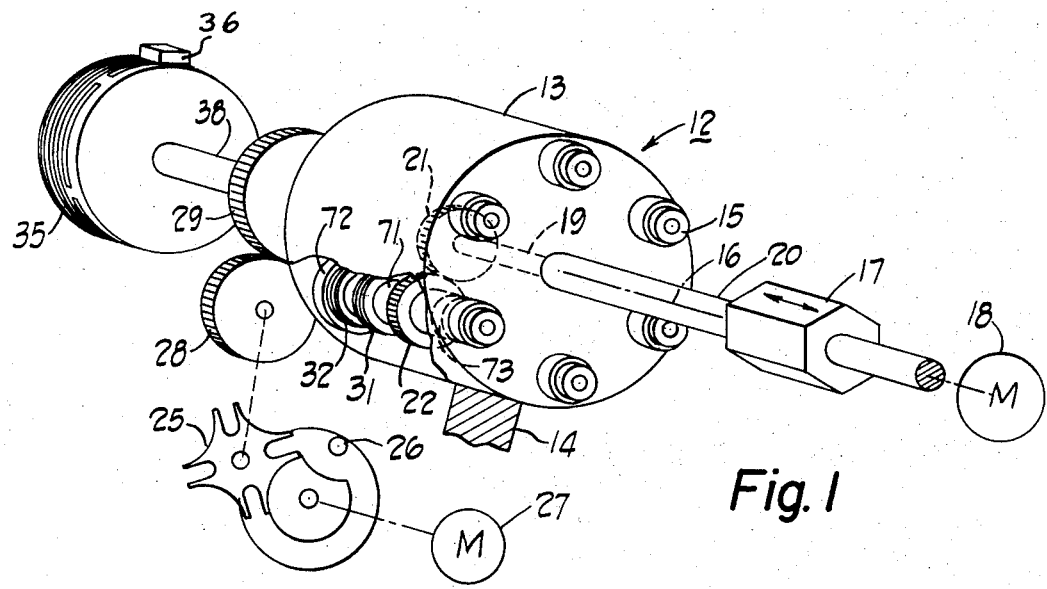
FIG. 1 is a perspective view of the spindle carrier of a machine including the brush and conductor assembly illustrating the present invention.
Figure 2:
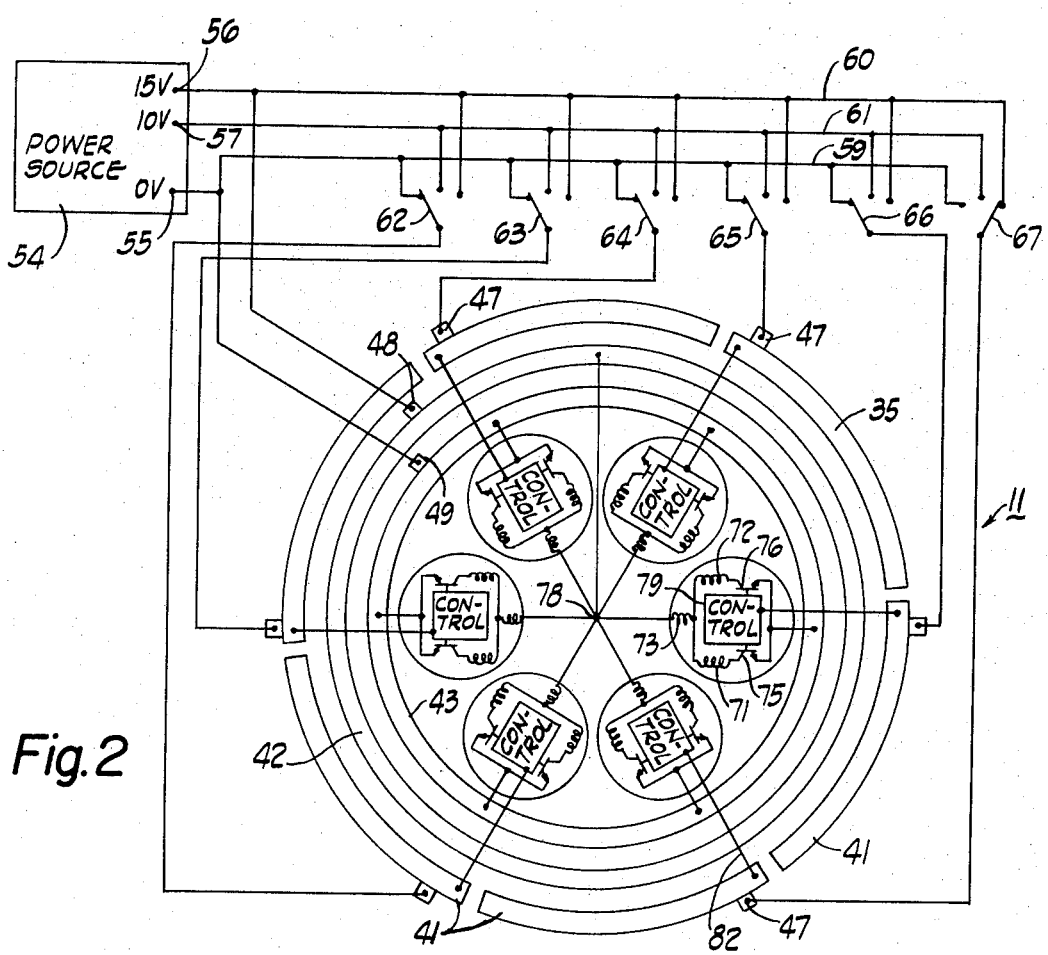
FIG. 2 is a schematic electrical diagram of the electric coupling control.
Figure 4:
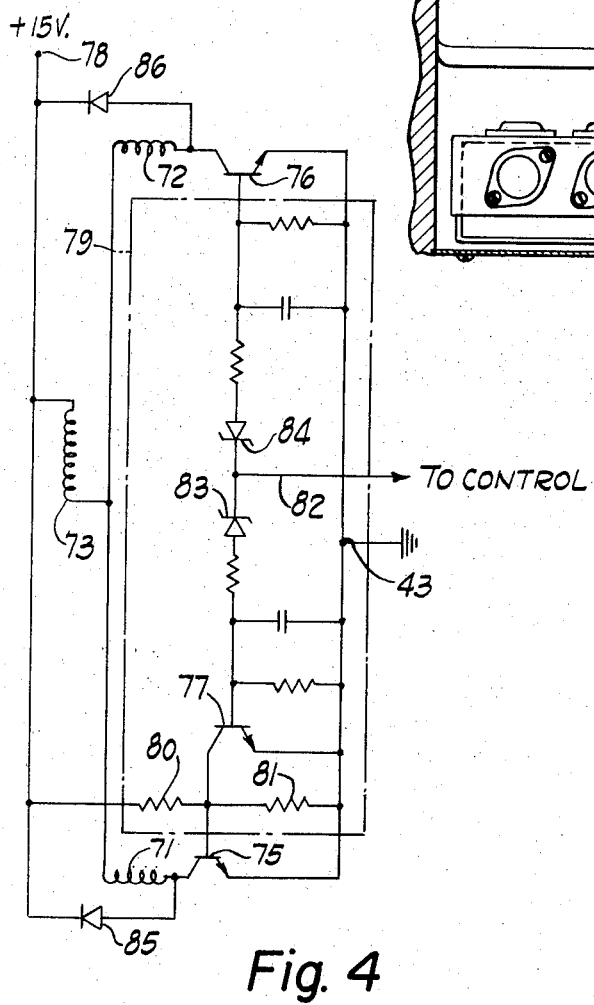
FIG. 4 is an electrical schematic diagram of one of the control circuits.

An electric coupling control system 11 is best shown in FIGS. 2 and 4 for use with a multiple spindle automatic machine tool 12 partially shown in FIG. 1. The complete machine tool is not illustrated as this may be any of the well-known designs for multiple spindle machines and in FIG. 1 there is illustrated an indexable carrier 13 journalled in a head stock frame 14 of the machine tool 12. The spindle carrier 13 carries a multiplicity of spindles 15 shown as six in number in this particular embodiment. Other numbers of spindles also may be used, such as four or eight. The spindles 15 are journalled on axes parallel to the spindle carrier axis 16. The spindles 15 in the usual manner carry workpieces, either chucked workpieces or long bar workpieces passing through the spindles. Workpieces, not illustrated, extend to the right of the spindles in FIG. 1 into a tooling area to be worked on by the usual tools of the machine tool. As an example, tools may be mounted on an end tool slide 17 which may reciprocate along the axis 16 to carry the tools to and from the workpieces in the spindles. Drive means to rotate each of the spindles is provided, and this is illustrated by a motor 18 which may be in the gear box or right end of the machine in this view of FIG. 1. The motor 18 drives through a spindle drive shaft 19 passing coaxially inside of a spindle carrier stem 20 to a central drive gear 21. Gears such as gear 22 are coaxially journalled on each of the plurality of spindles 15 and these gears, six in this case, mesh with the central gear 21.

Means are provided to index the spindle carrier 13, and this is illustrated as a Geneva cross 25 indexed by a drive roller 26 driven by any suitable source such as the motor 18 or as illustrated by the motor 27. The Geneva cross 25 is connected through gears 28 and 29 to index the spindle carrier 13 an appropriate amount, 60° in this case of six spindles. For $n$ spindles the indexing would be $1/n$ of a revolution. Each spindle is provided with a clutch 31 and a brake 32. Each spindle 15 in the spindle carrier has a first coupling connection through the associated clutch 31 to the drive gear 22 and has a second coupling connection through the associated brake 32 to the spindle carrier 13 to brake the spindle relative to this spindle carrier. FIG. 1 at the left end also shows a conductor assembly 35 which in this preferred embodiment is fastened for rotation with the spindle carrier 13. A brush carrier assembly 36 coacts with the conductor assembly 35 and is stationary on the frame 14. In this manner relative rotation between the assemblies 35 and 36 is provided in accordance with the relative indexing movement of the spindle carrier 13.

Figure 3:
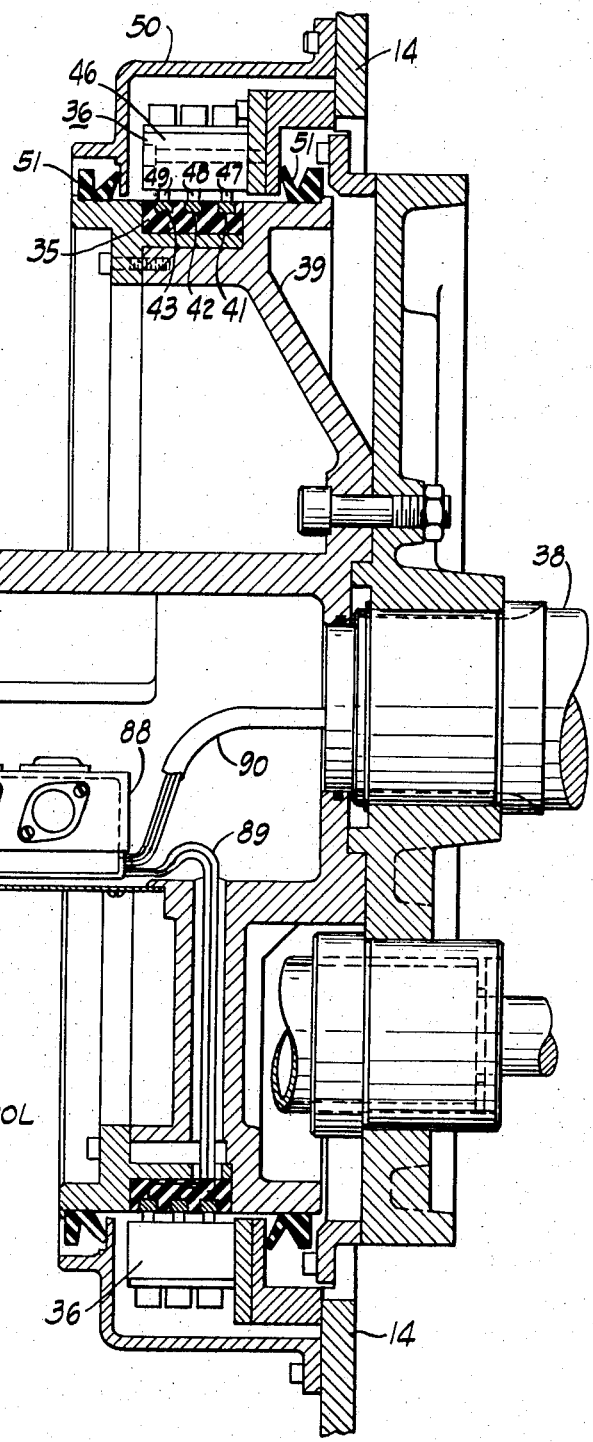
FIG. 3 is a partial sectional view through the machine tool showing the brush and control assembly.

FIG. 3 is a sectional view through the conductor and brush assemblies 35 and 36. FIG. 3 shows a shaft 38 which is fixed to the spindle carrier and indexes therewith. A drum 39 is fixed on this shaft 38 and carries the conductor assembly 35. This conductor assembly has first, second, and third conductor rings 41, 42, and 43, respectively. The first conductor ring 41 is segmented into n segments of equal arcs with $n$ being the number of spindles in the machine, six in this case. The second and third conductor rings 42 and 43 are annular slip rings.

The brush carrier assembly 36 includes an insulating holder 46 carrying brushes 47, 48, and 49 for cooperation with the conductor rings 41, 42, and 43, respectively. The insulating holder 46 is mounted on a fixed part of the frame 14. There is at least one brush carrier assembly 36, and it may be duplicated as shown at the bottom of FIG. 3. As many as six brush carrier assemblies could be used with this six-spindle machine in order to be able to control brake, clutch, and neutral conditions of the spindles in any desired indexable position of the spindle carrier. Where only one brush carrier assembly 36 is used it is provided on the frame 14 at that spindle carrier position whereat brake condition of the spindle is desired. An annular shroud 50 and oil seals 51 keep contaminants such as lubricating and cutting oil out of the conductor and brush carrier assemblies 35 and 36.

FIG. 2 shows schematically the control circuit used with the electric coupling control system 11. In this case the conductor assembly 35 is shown schematically in the form of a disc, although FIG. 3 illustrates it as being actually in the form of a drum. Either construction may be used. The brush carrier assembly 36 is shown as including the brushes 48 and 49 and n brushes 47. As stated above, any number of these brushes 47 may be used from one up to the number $n$.

The control circuit of FIG. 2 shows a power source 54 which supplies DC voltages of only a single polarity to the electrical coupling control. This power supply 54 has first and second terminals 55 and 56 supplying power and a third terminal 57 supplying a control voltage. The potential of the third terminal is intermediate to that of the first and second terminals. As an example, the voltages may be zero, 10, and 15 volts DC on the first, third, and second terminals, respectively.

Bus bars 59, 60, and 61 are connected to the terminals 55, 56, and 57, respectively. Up to $n$ selector switches may be provided, and FIG. 2 shows six such switches 62–67. Each of these selector switches has three conditions, and with mechanical switches these are physical contacts connected to the bus bars 59, 61, and 60, respectively, to select the clutch, neutral, and brake conditions respectively. The movable blade of each of these switches is connected to one each of the brushes 47 which are disposed at equal angles around the conductor assembly 35 to cooperate with a different arcuate sugment of the first conductor ring 41. These selector switches 62–67 in conjunction with the n segments of the conductor ring 41 provide selector means to provide electrical energization to the coil means in each of the spindles for selective clutch or brake actuation.

FIG. 2 illustrates schematically the six spindles within the center of the conductor assembly 35, and this is merely a schematic representation. Each of these spindle units is identical and contains a clutch coil 71 and a brake coil 72. Additionally a degaussing coil 73 is provided. As illustrated in FIG. 2 the degaussing coil 73 is connected in series to be energized whenever either the clutch coil 71 or brake coil 72 is energized. FIG. 1 shows the degaussing coil 73 positioned close to the nose of the spindle 15. Coil 73 is wound in opposition and has the same ampere-turns as each of the clutch and brake coil. This reduces the flux from the clutch or brake coils being transmitted to the spindle nose where it might magnetically attract chips cut from the work piece.

Actuation means is provided to energize the clutch and brake coils, respectively, and these include semiconductors shown as a first transistor 75 in series with the clutch coil 71 and a second transistor 76 in series with the brake coil 72. The common connection of these transistors is connected to the third conductor ring 43. The degaussing coils for each spindle are connected at a common point 78 which in turn is connected to the second conductor ring 42. By this means, power, for example, 15 volts DC is continuously supplied to the actuation means. A control circuit 79 is provided for each of the spindle clutch and brake units to control the proper actuation of each clutch and brake unit.

FIG. 4 shows one of the control circuits 79, and there are $n$ such units as shown in FIG. 2. FIG. 4 illustrates the common connection point 78 also ground or zero potential which is connected as shown in FIG. 2 to the third conductor ring 43. The clutch coil 71 is shown connected in series with the degaussing coil 73 and with the first transistor 75 between these power terminals 78 and 43. Also the brake coil 72 is connected in series with the degaussing coil 73 and the second transistor 76 between these same DC source terminals. The control circuit 79 includes a third transistor 77 which is connected in circuit with the first transistor 75 to be alternatively conducting therewith. Bias resistors 80 and 81 are connected between the source terminals 78 and 43 to bias into conduction the first transistor 75. This transistor thus normally causes the clutch 31 to be engaged when no voltage, either zero voltage or an open circuit, is supplied to the respective arcuate segment of the firt conductor ring 41. A control conductor 82 is shown connected to first and second breakdown diodes such as Zener diodes 83 and 84. These Zener diodes are connected in circuit with the bases of the transistors 77 and 76 respectively. These breakdown diodes have breakdown potentials less than the potentials on the third and second power source terminals 57 and 56, respectively. For example, if the power source terminals 57 and 56 are 10 and 15 volts, then diodes 83 and 84 may have breakdown potentials of 6 and 12 volts, respectively.

OPERATION

In the simplest configuration only one of the selector switches 62–67 need be used, and only one brush holder 46 may be used. As an example, let us assume that this is the selector switch 67 and the brush holder 46 in the 5 o'clock position as shown in FIG. 2. In this manner the machine tool will be able to control the clutch, neutral, or brake condition of each spindle of the spindle carrier as such spindle is indexed into the 5 o'clock position. It may be desired to stop the spindle from rotating when indexed into this position in order to perform a cross milling or cross drilling operation on the workpiece in the spindle 15. In such case the selector switch 67 would be set in the brake condition as shown in FIG. 2. Just prior to indexing movement the spindle in the 3 o'clock position will be in the clutch actuation condition. This is because there was an open circuit condition applied to the control circuit 79 for that spindle. An open circuit on control conductor 82 will not pass through the breakdown diode 83 or 84 hence transistors 76 and 77 will be nonconducting. The bias resistors 80 and 81 establishing normal conduction of the transistor 75 to keep the clutch oil 71 continuously energized during its entire indexing rotation throughout 300° until it starts to move into the 5 o'clock position. Assuming clockwise indexing rotation of the conductor assembly 35 as viewed in FIG. 2, as soon as the spindle carrier starts its index the brush 47 will move to the next arcuate segment of the first conductor ring 41. At this time its respective arcuate segment of the first conductor ring 41 will be supplied with 15 volts control voltage from the bus 60 and selector switch 67. This 15 volts will first pass through the breakdown diode 83 turning on the third transistor 77. This effectively shorts the bias resistor 81 placing a voltage of about 0.4 volts thereacross to turn off the first transistor 75. This de-energizes the clutch coil 71. A diode 85 is placed across the series combination of clutch coil 71 and degaussing coil 73 in order to help collapse the flux thereof. The 15 volts on control conductor 82 will secondly break down the diode 84 and cause conduction of the second transistor 76. This energizes the brake coil 72 to brake to a stop that particular spindle in the 5 o'clock position. A diode 86 is provided across the series combination of the brake coil 72 and degaussing coil 73 to collapse the flux thereof whenever the brake coil is de-energized.

A more complex control system may require that the spindle not only be stopped but also rotated slightly to orient it at a particular angle. In this case the selector 67 would not be a manual switch but would be an automatic control switch which first brakes the spindle to a stop as described above, and then the selector switch 67 would be moved to the neutral position. This would release the brake because now only 10 volts would be applied to the control conductor 82. This 10 volts control voltage will not break down the diode 84 but will break down the diode 83. Accordingly, the transistor 76 is non-conducting, transistor 77 is conducting, and transistor 75 is non-conducting. This means that both the clutch and brake coils 71 and 72 are de-energized for a neutral condition. A spindle positioner, not shown, may then be used to orient the spindle to a desired angle.

If two positions of the indexable spindle carrier are desired whereat spindle stopping may be obtained, then two brush holders and two circuits switches may be used; for example, those at the 5 o'clock and 11 o'clock positions. Of course, all of the positions may be used in which case the complete circuit of FIG. 2 will be used.

FIG. 3 shows that physically the control circuit 79 may be mounted for rotation with the spindle carrier shaft 38. In the preferred embodiment two such control circuits 79 are mounted in a module 88 inside the hollow spindle carrier shaft 38. This is for convenience for use with any of four, six, or eight spindle machine tools in which case two, three, or four modules would be used. A connector cable 89 connects control and power voltage between the conductor assembly 35 and a module 88. Another connector cable 90 connects the module 88 to the clutch, brake, and degaussing coils 71, 72, and 73 to supply power thereto.

The clutch, power, and neutral conditions are established by the control means from a single polarity voltage and are established by first, second, and third electrical conditions of the actuation means as determined by control voltages from the first, second, and third source terminals 55, 56, and 57, respectively. As explained above in the explanation of use of only a single selector switch 67, a particular clutch coil is energized continuously in the clutch actuation or first electrical condition as the spindle carrier is indexed except when the selector means dictates otherwise. This is also true for the circuit as shown in FIG. 2 wherein all the remaining selector switches 62–66 are shown in the clutch energization condition. Since the selector switches 62–67 are three position switches which include neutral as well as clutch and brake, it will be realized that the clutch coil means are established continuously in the first electrical condition as the spindle carrier is indexed except when the selector switch dictates a neutral or brake condition on a particular clutch and brake unit.

The semiconductors 75 and 76, which are part of the actuation means are controllable semiconductors conducting the actuation of the clutch and brake.

The present invention permits faster production time of workpieces because the clutches and brakes are rapidly energized and de-energized. Due to the low voltages used, the reactance of the clutch and brake coils are low permitting this rapid energization and de-energization. Also the clutches are continuously energized during indexing except when a brake or neutral condition is required. This means that the clutches are not continuously trying to drop out during indexing as a brush passes from one arcuate segment to another. Also this eliminates burning and pitting of the commutator segments promoting long life of the device. The power is supplied through the slip rings 42 and 43 and only small control currents are supplied on conductor ring 41. For example, only 15 to 60 milliamperes need be carried on the arcuate segments of the conductor ring 41, thus there is no burning of these commutator segments and no overenergization on the clutch or brake is required for rapid actuation thereof. Also there is a simplified structure mechanically and dual power supplies for positive and negative voltages are eliminated.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and scope of the invention as hereinafter claimed.

What is claimed is:

1. An electric coupling control for a multiple spindle automatic machine having means to index a spindle carrier with a plurality of n rotatable spindles therein and having drive means to rotate the spindles,
said electric coupling control comprising in combination,
a clutch and brake unit including coil means for each of said spindles,
each spindle in the spindle carrier having a first coupling through the associated clutch to the drive means and having a second coupling through the associated brake to the spindle carrier to brake the spindle relative to the spindle carrier,
clutch and brake actuation means for at least one of said units including,
power source means,
relatively rotatable brush and conductor assemblies,
means to establish relative rotation between said assemblies in accordance with indexing movements of the spindle carrier,
said actuation means including means connecting said power source means through said brush and conductor assemblies to establish energization of said coil means in first and second electrical conditions to actuate said one clutch and said one brake, respectively,
selector means including said conductor assembly to provide electrical energization to said coil means in each of said spindles for selective clutch or brake actuation,
and control means for each clutch and brake unit operable from a single polarity voltage from said power source means to establish said first and second electrical conditions of said actuation means.

2. An electric coupling control as set forth in claim 1, including a separate coil for each clutch and brake for each of said spindles.

3. An electric coupling control as set forth in claim 1, wherein said selector means includes n switches each having clutch and brake conditions to establish clutch or brake actuation of each of the n spindles.

4. An electric coupling control as set forth in claim 1, including a degaussing coil in said actuation means connected to be energized with each of the coil means of said clutch and brake units.

5. An electric coupling control as set forth in claim 1, including a continuous conductor ring in said conductor assembly to establish all clutch coil means continuously in said first electrical condition as the spindle carrier is indexed except when said selector means dictates otherwise.

6. An electric coupling control as set forth in claim 5, including a second continuous conductor ring in said conductor assembly to establish all clutch coil means continuously in said first electrical condition as the spindle carrier is indexed except when said selector means dictates otherwise.

7. An electric coupling control as set forth in claim 1, wherein said clutch and brake units have a neutral condition,
and said control means being operable to establish a third electrical condition for the neutral condition of said clutch and brake units.

8. An electric coupling control as set forth in claim 7, including a continuous conductor ring in said conductor assembly to establish all clutch coil means continuously in said first electrical condition as the spindle carrier is indexed except when said selector means dictates a neutral or brake condition on a particular clutch and brake unit.

9. An electric coupling control as set forth in claim 7, wherein said control means is operable from a single polarity voltage from said power source means to establish said third electrical condition of said actuation means.

10. An electric coupling control as set forth in claim 7, wherein said power source means includes first, second, third output terminals with a single polarity DC voltage thereon and with the potential of said third terminal being intermediate to that of said first and second terminals.

11. An electric coupling control as set forth in claim 7, wherein said selector means includes n switches each having clutch, brake and neutral conditions to establish clutch or brake actuation or actuation of neither for each of the *n* spindles.

12. An electric coupling control as set forth in claim 1, wherein said actuation means includes first and second semiconductor devices selectively conductive by said control means to establish said first and second electrical conditions of said actuation means.

13. An electric coupling control as set forth in claim 12, wherein said semiconductor devices are controllable.

14. An electric coupling control as set forth in claim 12, wherein said control means includes a breakdown diode connected to said semiconductor devices to change one of said first and second electrical conditions upon the breakdown potential of said diode being exceeded.

15. An electric coupling control as set forth in claim 12, including in said control means a third semiconductor device connected to said first semiconductor device to be alternatively conducting therewith.

16. An electric coupling control as set forth in claim 15, wherein said control means includes first and second breakdown diodes connected to said third and second semiconductors to control selectively the conduction of said third and second semiconductor devices upon the breakdown potentials of the first and second breakdown diodes being exceeded, respectively.

17. An electric coupling control as set forth in claim 16, including a common connection to said first and second breakdown diodes to apply to each a control voltage from said selector means.

18. An electric coupling control as set forth in claim 17, including a segmented conductor with n segments in said conductor assembly, and a connection from said first and second breakdown diodes to one of said $n$ segments.

* * * * *